(12) United States Patent
Jeon et al.

(10) Patent No.: US 12,454,316 B2
(45) Date of Patent: Oct. 28, 2025

(54) SIDE SILL REINFORCEMENT MEMBER FOR VEHICLE AND SIDE SILL ASSEMBLY INCLUDING THE SAME

(71) Applicants: Hyundai Motor Company, Seoul (KR); Kia Corporation, Seoul (KR)

(72) Inventors: Chang Un Jeon, Hwaseong-si (KR); Seung Tae Song, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 411 days.

(21) Appl. No.: 18/099,562

(22) Filed: Jan. 20, 2023

(65) Prior Publication Data
US 2024/0116575 A1     Apr. 11, 2024

(30) Foreign Application Priority Data
Oct. 5, 2022  (KR) .................. 10-2022-0127035

(51) Int. Cl.
| B62D 27/02 | (2006.01) |
| B62D 21/15 | (2006.01) |
| B62D 25/02 | (2006.01) |
| B62D 25/20 | (2006.01) |

(52) U.S. Cl.
CPC ........... *B62D 25/025* (2013.01); *B62D 21/15* (2013.01); *B62D 21/157* (2013.01); *B62D 25/2036* (2013.01); *B62D 27/023* (2013.01)

(58) Field of Classification Search
CPC .. B62D 25/025; B62D 25/2036; B62D 25/04; B62D 25/06; B62D 25/08; B62D 25/20; B62D 25/2009; B62D 25/2018; B62D 25/2027; B62D 25/2054; B62D 27/023; B62D 21/152; B62D 21/157; B60Y 2306/01

USPC .... 296/29, 30, 193.06, 210, 187.01, 9, 1, 12
See application file for complete search history.

(56) References Cited

U.S. PATENT DOCUMENTS

| 5,246,264 | A | 9/1993 | Yoshii | |
| 8,308,227 | B2 * | 11/2012 | Tsuruta | B62D 25/2036 |
| | | | | 296/209 |
| 9,045,175 | B2 * | 6/2015 | Mori | B62D 25/2036 |

(Continued)

FOREIGN PATENT DOCUMENTS

| CN | 101565059 A | 10/2009 |
| JP | 2008-110626 | 5/2008 |
| JP | 2010-235013 | 10/2010 |

(Continued)

OTHER PUBLICATIONS

KR2011011088 Text (Year: 2011).*

*Primary Examiner* — Dennis H Pedder
(74) *Attorney, Agent, or Firm* — Morgan, Lewis & Bockius LLP

(57) ABSTRACT

A side sill reinforcement member for a vehicle, includes an external member including a plurality of external panels extending in a longitudinal direction of the vehicle and forming an internal space by coupling the external panels to each other and an internal reinforcement member mounted in the internal space of the external member and including a plurality of internal panels extending in the longitudinal direction of the vehicle, the internal panels being each fixed on a first side thereof to an internal surface of the external panel and fixed on a second side thereof in contact with each other in the internal space.

13 Claims, 4 Drawing Sheets

(56) References Cited

U.S. PATENT DOCUMENTS 10,137,935 B2 * 11/2018 Koch .................... B62D 21/157
11,535,298 B2 * 12/2022 Son ...................... B62D 21/157

FOREIGN PATENT DOCUMENTS

| JP | 2018-0001890 | | | 1/2018 | |
|----|--------------|---|---|--------|---|
| KR | 10-2000-0053612 | | | 8/2000 | |
| KR | 2011011088 | A | * | 2/2011 | ......... B60R 13/0206 |
| KR | 10-2019-0001990 | | | 1/2019 | |
| WO | WO 2019/176792 | | | 9/2019 | |

* cited by examiner

SIDE SILL REINFORCEMENT MEMBER FOR VEHICLE AND SIDE SILL ASSEMBLY INCLUDING THE SAME

CROSS REFERENCE TO RELATED APPLICATION

The present application claims priority to Korean Patent Application No. 10-2022-0127035, filed Oct. 5, 2022, the entire contents of which is incorporated herein for all purposes by this reference.

BACKGROUND OF THE PRESENT DISCLOSURE

Field of the Present Disclosure

The present disclosure relates to a side sill of a vehicle, and more particularly, to a reinforcement member provided in the side sill and a vehicle's side sill assembly including the same.

Description of Related Art

Typically, as one of the reinforcement members forming the side opening of a vehicle, the side sill is located under the door, preferably neither too high for the convenience of getting on or off nor too low for the avoidance of damage by contact with an obstacle on the ground, and has appropriate dimensions while maintaining a cross-sectional area to secure the required rigidity and strength.

The side seal is provided to form an internal space (sill space) by combining an internal panel and an external panel connected to a center floor panel mounted on a vehicle by welding or the like.

With the attempt to efficiently use the internal empty space formed in the side sill, the internal empty space of the side sill has been utilized to absorb the impact from the outside of the vehicle and to increase the deformation strength.

That is, the side sill of the vehicle is reinforced to protect the occupants and the vehicle from impact by inserting a reinforcement into its internal empty space, which may be viewed in the internal cross section, as a cause of the low deformation strength such as being easily crushed.

However, the conventional reinforcement rendered by manufacturing a reinforcement member from an extruded material of aluminum and inserting the reinforcement member into the internal space of the side sill has drawbacks of fastening complexity caused by the necessity of a plurality of bonding members for boning the aluminum extruded material with a side sill external panel made of steel material and increase of manufacturing cost caused by use of the aluminum material.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a side sill of a vehicle that includes a reinforcement member fabricated by forming an internal space with an external panel formed with a plurality of panels, forming an internal panel formed with a plurality of panels to connect to the internal surface of the internal space, and combining the exterior and internal panels made of a steel material through welding.

A side sill reinforcement member for a vehicle according to an exemplary embodiment of the present disclosure includes an external member including a plurality of external panels extending in a longitudinal direction of the vehicle and forming an internal space by coupling the external panels to each other and an internal reinforcement member mounted in the internal space of the external member and including a plurality of internal panels extending in the longitudinal direction of the vehicle, the internal panels being each fixed on a first side thereof to an internal surface of the external panel and fixed on a second side thereof in contact with each other in the internal space.

The plurality of external panels may be coupled at an upper and a lower portion to each other, and the internal panels may include a first panel extending in the longitudinal direction of the vehicle in the internal space of the external member and coupled at an upper portion and a lower end portion thereof together with the upper portion and the lower portion of the external panels.

The internal panels may include second panels extending in the longitudinal direction of the vehicle and in a widthwise direction of the vehicle to connect the external panels and the first panel.

The second panels may include a central portion bent to be bonded to the first panel and extension portions extending from the central portion, each of the extension portions including at a distal end portion thereof a flange portion coupled to an internal side of the external panels.

The external panels may be a pair and include respective upper flanges bent upward at upper end portions thereof and being coupled in pair and respective lower flanges bent downward at lower end portions thereof and being coupled in pair.

The external panels may include a plurality of first penetration holes allowing a bonding device for bonding the first panel and the second panel to pass therethrough and spaced from each other in the longitudinal direction of the vehicle.

The external panels may include first beads formed on an upper surface or a lower surface thereof.

The internal panels may include second beads formed on an upper surface or a lower surface thereof.

The external or the internal panels may include beads formed on an upper surface or a lower surface thereof, the beads extending in a widthwise direction of the vehicle.

The external and the internal panels may be made of steel and coupled together by welding.

A side sill assembly for a vehicle which is provided with the side sill reinforcement member may include a side sill internal panel and a side sill external panel covering the side sill reinforcement member therein, wherein the external panels may be coupled to the side sill internal panel or the side sill external panel.

The side sill internal panel and the side sill external panel may be coupled at upper portion thereof to cover the side sill reinforcement member therein, and the first panel may include extension portions extending upward and downward at upper and lower end portions thereof, the extension portions being coupled together with the upper portion and a lower portion of the side sill internal panel and the side sill external panel.

The first panel may include second penetration holes formed therein, and the external panel may include third penetration holes formed therein, wherein the second and third penetration holes may be formed at positions corresponding to each other laterally to allow a bonding device to pass therethrough for bonding the external panels to the side sill internal panel or the side sill external panel.

The second and third penetration holes may be formed in plurality by being vertically spaced from the central portions of the first panel and the external panels.

The side sill reinforcement member for a vehicle according to an exemplary embodiment of the present disclosure is advantageous in terms of reducing manufacturing cost and weight caused by thickness reduction in comparison with the conventional reinforcement member made of aluminum material by fabricating the external panel and internal panels forming the reinforcement member with a steel material.

Also, the side sill reinforcement member for a vehicle according to an exemplary embodiment of the present disclosure is advantageous in terms of reducing manufacturing cost by bonding the external panel and the internal panel by welding without necessity of a separate bonding member such as a bolt.

Also, the side sill reinforcement member for a vehicle according to an exemplary embodiment of the present disclosure is advantageous in terms of maintaining the cross-section of the reinforcement member in the event of a side collision of the vehicle and further reinforcing the rigidity of the side sill by forming beads protruding in the vertical direction on the exterior and internal panels.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
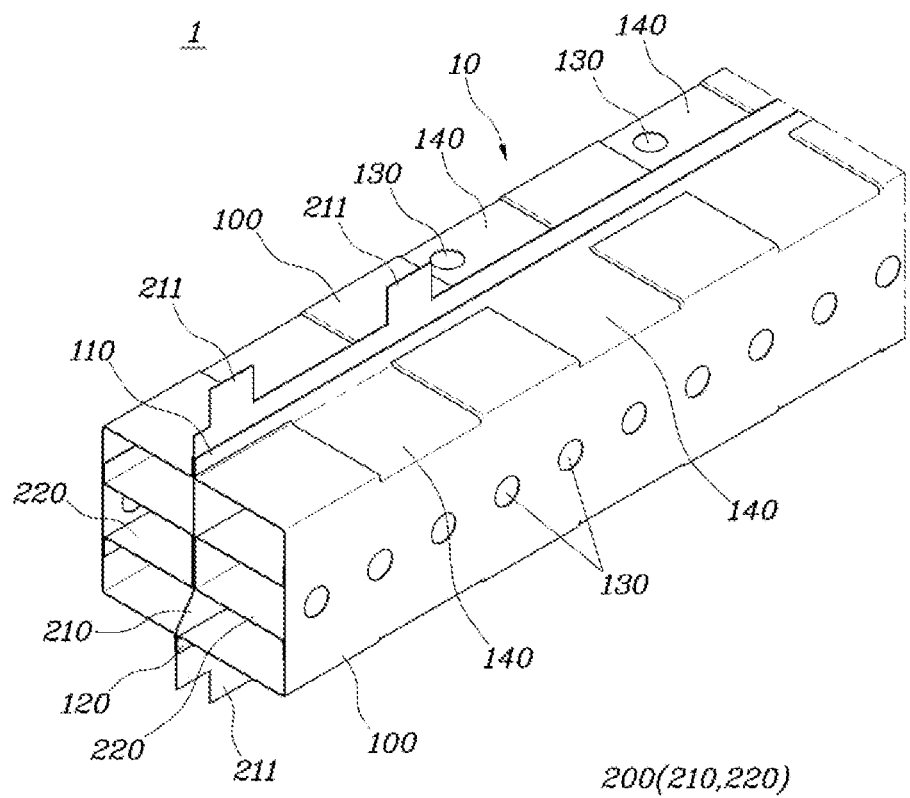
FIG. 1 is a perspective view of a side sill reinforcement member for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, descriptions are made of the exemplary embodiments disclosed in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, having no distinct meaning or role.

Furthermore, detailed descriptions of well-known technologies related to the exemplary embodiments included in the present specification may be omitted to avoid obscuring the subject matter of the exemplary embodiments included in the present specification. Furthermore, the accompanying drawings are only for easy understanding of the exemplary embodiments included in the present specification and do not limit the technical spirit included herein, and it should be understood that the exemplary embodiments include all changes, equivalents, and substitutes within the spirit and scope of the present disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

The vehicle may have a side sill coupled to the side of the floor of the vehicle to protect against a side impact.

The side sill may be formed of a plurality of members or panels, and a reinforcement member for reinforcing the rigidity of the side sill may be inserted therein to be coupled thereto.

The conventional side sill reinforcement member for a vehicle has the drawbacks of taking a lot of time to manufacture in terms of the manufacturing process of extruding aluminum to take shape and coupling the aluminum member to a connecting portion of the side sill external panel made of steel using a number of tools such as bolts and increasing manufacturing cost in terms of using aluminum as a raw material.

The present disclosure is directed to providing a side sill reinforcement member which is configured for reducing manufacturing cost and simplifying manufacturing process by forming the side sill reinforcement member with a plurality of steel panels.

Figure 2:
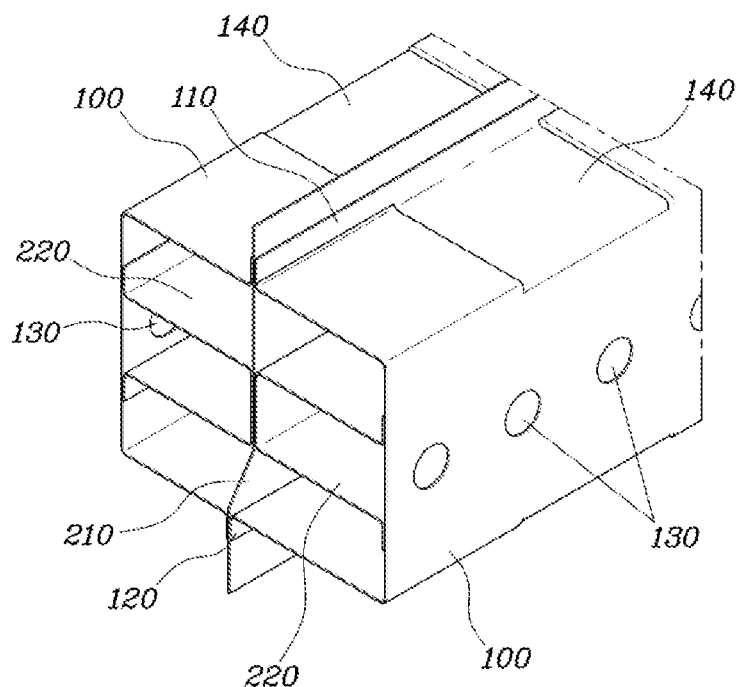
FIG. 2 is an enlarged end view of an end portion of a side sill reinforcement member for a vehicle according to various exemplary embodiments of the present disclosure.
Figure 3:
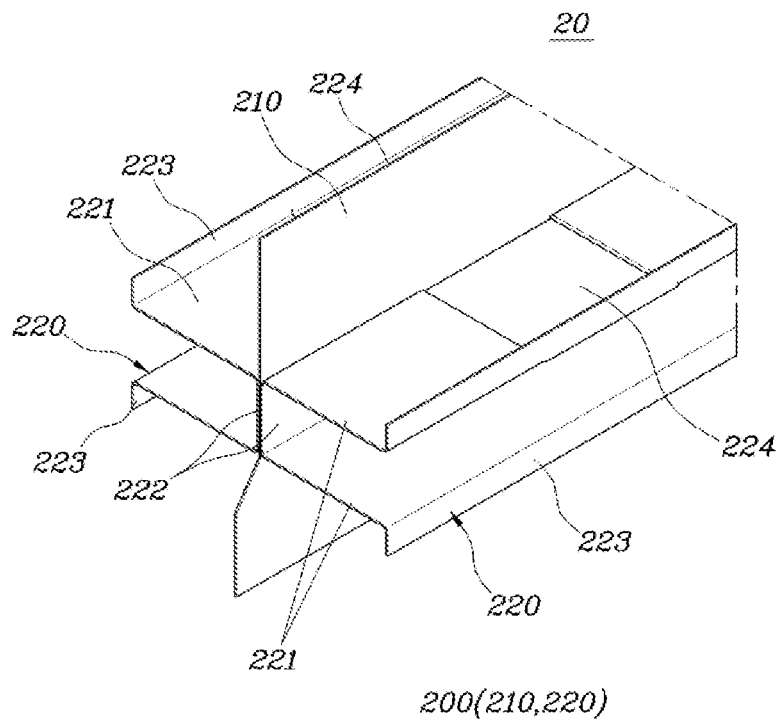
FIG. 3 is a perspective view of an internal reinforcement member according to various exemplary embodiments of the present disclosure.
Figure 4:
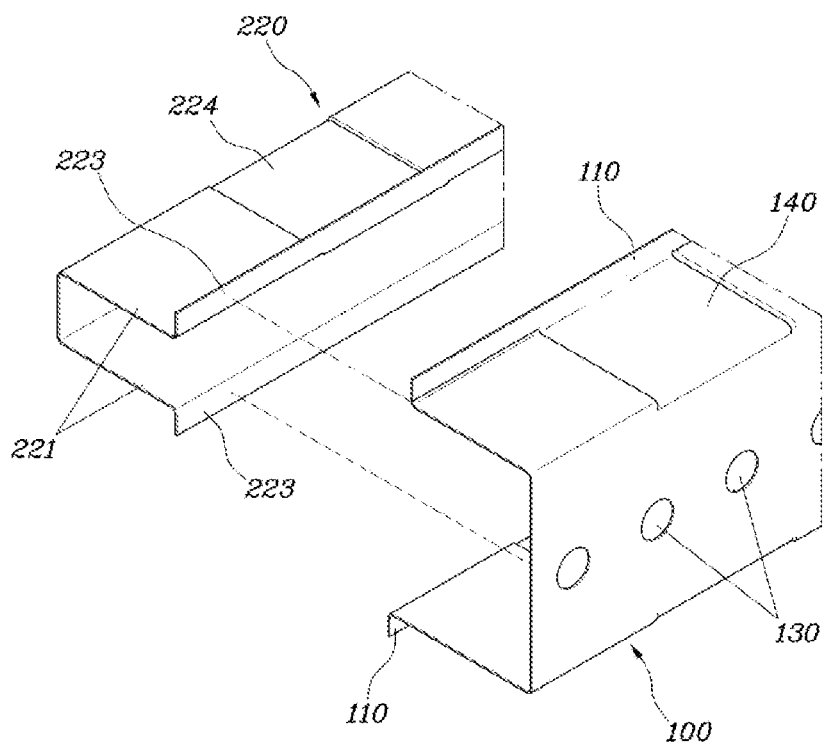
FIG. 4 is a perspective view exemplarily illustrating a second panel and an external panel being combined according to various exemplary embodiments of the present disclosure.
Figure 5:
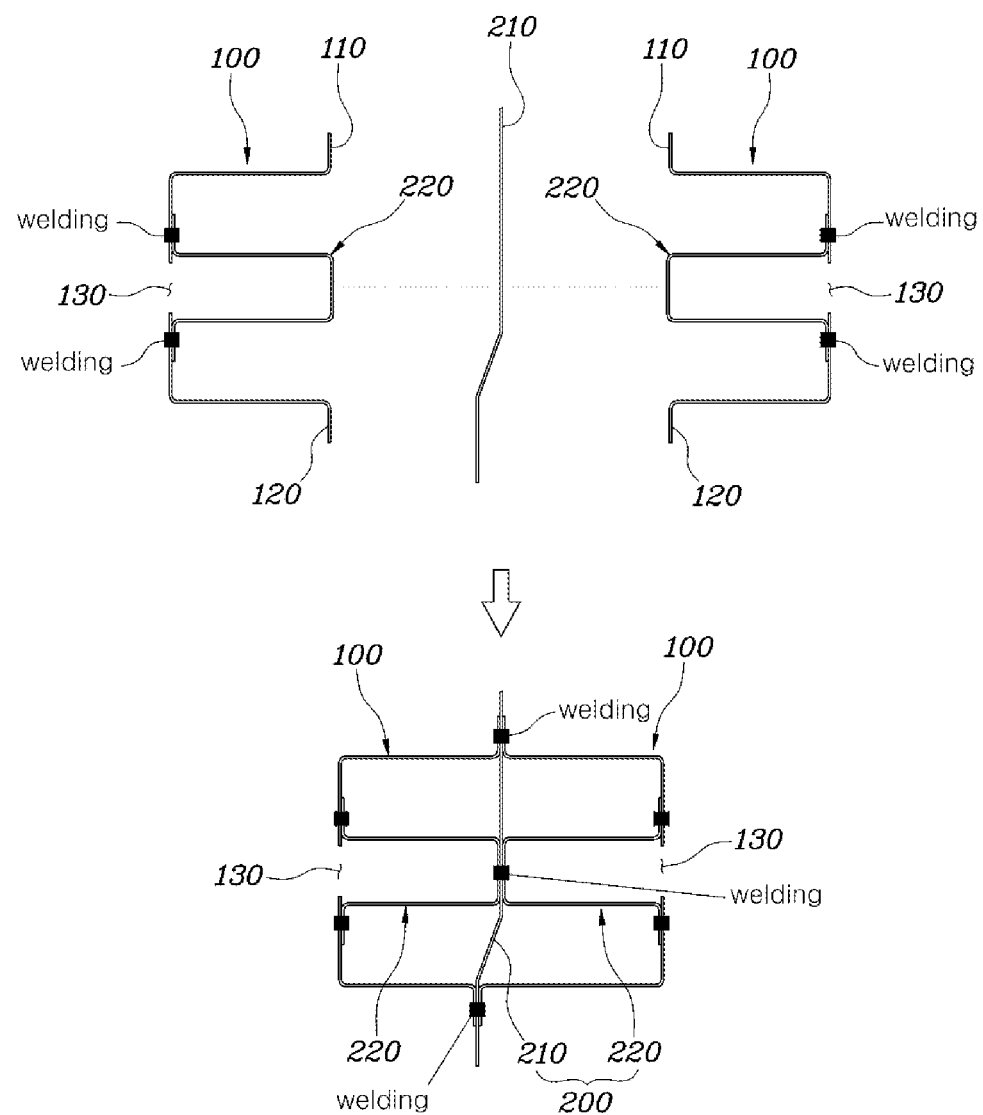
FIG. 5 is a cross-sectional view exemplarily illustrating a first panel being combined with an external panel and a second panel according to various exemplary embodiments of the present disclosure.

FIG. 1 is a perspective view of a side sill reinforcement member 1 for a vehicle according to various exemplary embodiments of the present disclosure, FIG. 2 is an enlarged end view of an end portion of a side sill reinforcement member 1 for a vehicle according to various exemplary embodiments of the present disclosure, FIG. 3 is a perspective view of an internal reinforcement member 20 according to various exemplary embodiments of the present disclosure, FIG. 4 is a perspective view exemplarily illustrating a second panel 220 and an external panel 100 being combined according to various exemplary embodiments of the present disclosure, FIG. 5 is a cross-sectional view exemplarily illustrating a first panel 210 being combined with an external panel 100 and a second panel 220 according to various exemplary embodiments of the present disclosure.

A description is made of the side sill reinforcement member 1 for a vehicle according to various exemplary embodiments of the present disclosure with reference to FIG. 1, FIG. 2, FIG. 3, FIG. 4, and FIG. 5.

As shown in FIG. 1 and FIG. 2, the side sill reinforcement member 1 for a vehicle according to an exemplary embodiment of the present disclosure may include an external member 10 including a plurality of external panels 100 extending in the longitudinal direction of the vehicle and combined with each other to form an internal space of the side sill and an internal reinforcement member 20 disposed in an internal space of the external member 10 and including a plurality of internal panels 200 extending in the longitudinal direction of the vehicle that are each fixed to the internal surface of the external panel 100 at one side and fixedly connected to each other at the other side inside the internal space.

The external member 10 may be formed to have an empty internal space by coupling the external panels 100 to each other in a bent state, and the internal reinforcement member 20 may be formed of a plurality of internal panels 200 extending in a direction crossing the longitudinal direction of the external member 10 to connect the external panels 100 inside the internal space of the external member 10.

Both the exterior and internal panels 100 and 200 are made of steel, allowing reduction in manufacturing cost compared to the conventional reinforcement member made of aluminum and reduction in thickness and weight, and they are bonded to each other by welding, obviating the need of separate fastening members such as bolts, resulting in further cost reduction.

In detail, the external member 10 may be formed by bending a pair of external panels 100, which extend in the longitudinal direction of the vehicle, outwards to be symmetrical and bonding the upper and lower portions thereof to each other to form the upper, lower, and side surfaces of the external member 10.

Here, the external panels 100 are each provided with an upper flange 110 and a lower flange 120 extending upward and downward respectively at upper and lower end portions thereof and welded in surface-contact with each other on the upper and lower flanges 110 and 120 to improve bonding strength of the external member 10 formed by the pair of the external panels 100.

The internal panels 200 may include a first panel 210 and second panels 220.

The first panel 210 may extend in the longitudinal direction of the vehicle in the internal space of the external member 10 and connects at its upper and lower end portions to the upper and lower portions of the external member 10 to be bonded with the upper and lower portions of the external panel 100, and the second panels 220 may extend in the longitudinal direction of the vehicle and in a widthwise direction of the vehicle in the internal space of the external member 10 to connect the external panel 100 and the first panel 210.

As shown in FIG. 1, FIG. 2, and FIG. 3, the first panel and the second panel 210 and 220 may be formed to extend in the longitudinal direction of the vehicle in the same manner as the external panel 100.

The first panel 210 may be formed to connect the upper and lower portions of the external panel 100 to be bonded together with the upper and lower flanges 110 and 120 when the flanges are welded together.

Through this, the first panel 210 can absorb the impact in the lateral direction of the vehicle in the event of a side collision of the vehicle.

Here, the second panels 220 may be formed in pair and disposed on opposite sides of the first panel 210 to connect the side surfaces of the first panel 210 and the external panels 100.

Through this, the first panel and the second panel 210 and 220 provided inside the external member 10 is configured for improving the rigidity of the external member 10.

As shown in FIG. 1 and FIG. 2, the second panel 220 connecting the side surface of the external panel 100 and the first panel 210 has a central portion 222 bent to be bonded to the first panel 210 and connecting portions 221 extending from the central portion 222 to connect at their distal end portions to the internal surface of the external panel 100.

The second panels 220 may be formed in pairs symmetrical to the first panel 210 and divide the internal space of the external member 10 into 6 equal portions along with the first panel 210. The second panels 220 may divide the height of the internal space split by the first panel 210 into 3 equal heights so that the side sill reinforcement member 1 uniformly absorbs the impact in the event of a side collision of the vehicle.

As shown in FIG. 3, the second panel 220 may be formed to have the central portion 222 bent to be parallel to the first panel 210 and flange portions 223 bent upward and downward at the opposite end portions of the second panel 220.

The pair of second panels 220 are combined by welding the central portions 222 in a state of surface-contact with the first panel 210 on the opposite sides of the first panel 210 and connecting the flange portions 223 formed at the opposite end portions of the second panels 220 to the internal surface of the external member 10 in the internal space.

The second panels 220 are welded to the first panel 210 and the external panels 100 in a state of surface-contact with each other, improving the bonding strength at each bonding portion.

Furthermore, the second panel 220 disposed outwardly from the vehicle and the second panel 220 disposed inward to the vehicle, with respect to the first panel 210, form a primary and secondary deformation section, respectively, to serve to support the cross-section in the transverse direction against the collision load during a side collision of the vehicle, resulting in preventing the intrusion of the external collision load into the passenger compartment.

The lower flanges 120 of the paired external panels 100 may be coupled at a point spaced from that of the upper flanges 110 in the widthwise direction of the vehicle. The first panel 210 coupled together with the upper and lower flanges 110 and 120 may be bonded in the state of being bent toward the lower flanges 120 at its bottom part as much as the upper and lower flanges 110 and 120 are spaced from each other.

In detail, as shown in FIG. 5, the lower flanges 120 may be spaced from the upper flanges 110 toward the interior of the vehicle.

Through this, the side sill reinforcement member 1 may be coupled, in the state of being inserted into the side sill, to the floor side of the vehicle body.

The external panel 100, the first panel 210, and the second panel 220 may be combined in the order shown in FIG. 3 and FIG. 4.

It is possible first to bond the flange portions 223, in the state where the second panels 220 respectively contact with the corresponding paired external panels 100, to the internal surface of the external panel 100 and then bond the first panel 210, in the state where the first panel 210 is disposed between the external panels 100, with the external panels 100 by welding together at the upper and lower portions of the external panels 100 and the central portions 222 of the internal panels 200.

Through this, it is possible to improve the bonding force and robustness between the internal reinforcement member 20 formed of the first panel and the second panel 210 and 220 and the external member 10 formed of the external panels 100.

Here, as shown in FIGS. 1, 2, and 4, a welding device must be inserted into the internal space to weld the central portions 222 of the second panels 220 to the first panel 210. To insert the welding device into the internal space, first penetration holes 130 are formed in the external panel 100 through which the welding mechanism is inserted to weld the first panel and the second panel 210 and 220 to each other.

In the present manner, a welding device may be easily inserted into the inside of the external member 10 to weld the first panel and the second panel 210 and 220, improving the robustness of the side sill reinforcement member 1 and speeding up the bonding process in the manufacturing procedure.

Furthermore, as shown in FIG. 1, a plurality of first penetration holes 130 may be disposed on the external panels 100, spaced from each other in the longitudinal direction thereof.

Through this, it is possible to extend the welding part formed between the first panel and the second panel 210 and 220 in the longitudinal direction of the vehicle, further improving the bonding force between the first panel and the second panel 210 and 220.

As shown in FIGS. 1 to 2, the external panels 100 may have first beads 140 protruding upward and downward on the upper and lower surfaces thereof.

In detail, the first beads 140 disposed on the upper and lower surfaces of the external panel 100 may be formed to extend in the horizontal direction of the vehicle and to have a length varying with the designer, and in various exemplary embodiments of the present disclosure, the first beads 140 may be formed to protrude downward from the upper surface of the external panels 100 and upward from the lower surface of the external panels 100.

Through this, it is possible to reinforce the rigidity of the external member 10 because the first beads 140 absorb the impact to maintain the cross-section during a side collision of the vehicle.

Furthermore, as shown in FIG. 3, the second panels 220 included in the internal panels 200 may have second beads 224 protruding upwardly or downwardly from upper or lower surfaces of the connecting portions 221 extending from the central portion 222.

In detail, the second beads 224 disposed on the upper and lower surfaces of the connecting portions 221 of the second panels 220 may be formed to extend in the horizontal direction of the vehicle and to have a length varying with designer, and in various exemplary embodiments of the present disclosure, the second beads 224 may be formed to protrude downwardly from the upper surface of the panels and upwards from the lower surface of the panels.

Through this, it is possible to reinforce the rigidity of the internal reinforcement member 20 because the second beads 224 absorb the impact to maintain the cross-section during a side collision of the vehicle.

In an exemplary embodiment of forming the first and second beads 140 and 224, the first and second beads 140 and 224 may be formed by pressing the external panels 100 and the second panels 220 with a press device.

Furthermore, the beads are formed to extend in the widthwise direction of the vehicle and to be spaced apart in the longitudinal direction, effectively absorbing the impact and supporting the side sill during a lateral collision of the vehicle.

Figure 6:
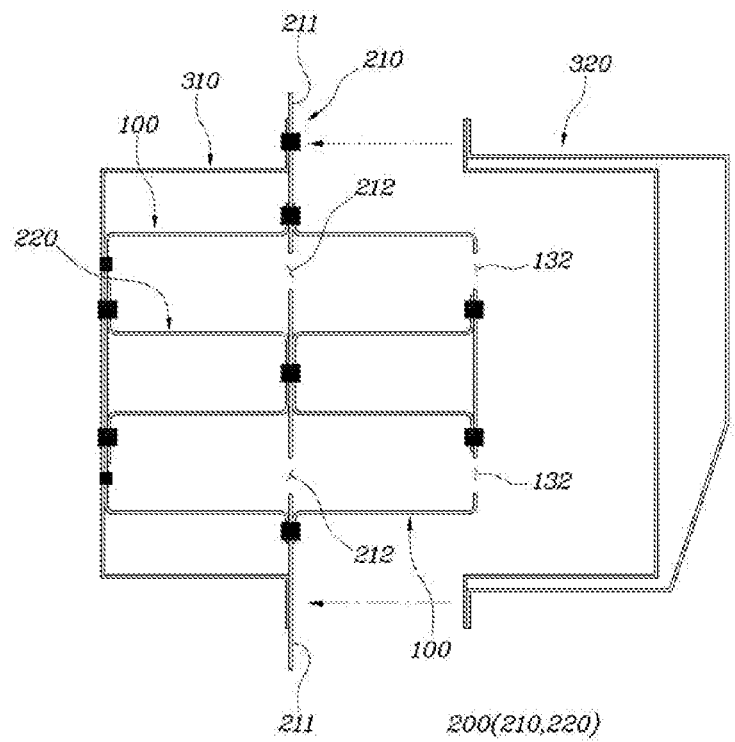
FIG. 6 and FIG. 7 are cross-sectional views exemplarily illustrating assembling a side sill assembly fora vehicle according to various exemplary embodiments of the present disclosure.
Figure 7:
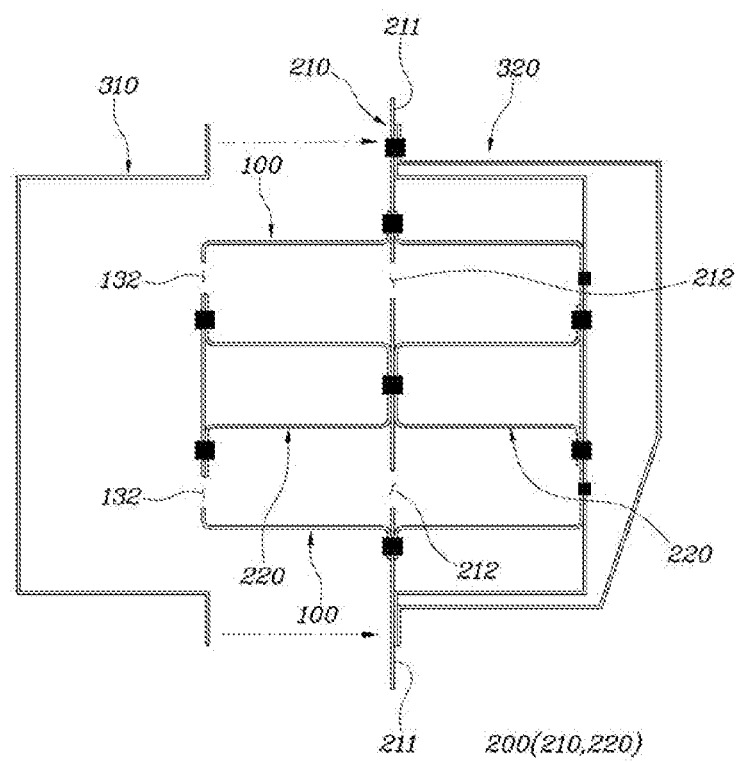

FIG. 6 and FIG. 7 are cross-sectional views exemplarily illustrating assembling a side sill assembly of a vehicle according to various exemplary embodiments of the present disclosure.

A description is made of the side sill reinforcement member 1 for a vehicle according to various exemplary embodiments of the present disclosure with reference to FIG. 6 and FIG. 7.

A side sill internal panel 310 and a side sill external panel 320 covering the side sill reinforcement member 1 are included, and the external surface of the external panel 100 may be coupled to the side sill internal panel 310 or the side sill external panel 320.

The side sill reinforcement member 1 inserted into the side sill coupled to the vehicle body forms a side sill assembly of the vehicle along with the side sill internal panel 310 and the side sill external panel 320 covering the outside of the reinforcement member, and the side sill assembly is coupled to the floor side of the vehicle body to absorb impact in the event of a side collision of the vehicle, protecting the interior of the vehicle body and passengers.

The side sill reinforcement member 1 inserted into the inside of the side sill internal panel 310 and the side sill external panel 320 may be coupled on one of its external surfaces to the side sill internal panel 310 or the side sill external panel 320 by welding to be fixed to the side sill internal panel 310 and the side sill external panel 320.

As shown in FIG. 6 and FIG. 7, the side sill internal panel 310 and the side sill external panel 320 may be formed to have upper portions welded to each other and lower portions welded to each other to cover the side sill reinforcement member 1.

Here, the side sill reinforcement member 1 may be provided with extension portions 211 extending upward and downward respectively from the upper and lower portions of the first panel 210 to be bonded together with the side sill internal panel 310 and the side sill external panel 320 when they are combined to each other.

In detail, the extension portion 211 extending upwards from the upper portion of the first panel 210 may be welded together with upper portions of the side sill internal panel 310 and the side sill external panel 320, and the extension portion 211 extending downwardly from the lower portion of the first panel 210 may be welded together with the lower portions of the side sill internal panel 310 and the side sill external panel 320.

Through this, the side sill reinforcement member 1 may be integrally coupled to the side sill internal panel 310 and the side sill external panel 320.

Furthermore, the external surface of the side sill reinforcement member 1 may be welded to the internal surface of the side sill internal panel 310 or the side sill external panel 320 before the extension portions 211 are coupled.

In detail, the external panel 100 may be provided with third penetration holes 132, and the first panel 210 may be provided with a second penetration hole 212 formed at positions laterally corresponding to the third penetration hole 132.

Furthermore, the third penetration holes 132 and the second penetration holes 212 may be formed in plurality spaced apart in the perpendicular direction to avoid a part where the second panels 220 and the first panel 210 contact each other.

As shown in FIG. 6, in the case where the third penetration holes 132 are formed on the external panel 100 facing outwardly from the vehicle, the welding device can pass through the third penetration holes 132 and the second penetration holes 212 to weld the external panel 100 facing inward and the side sill internal panel 310.

Furthermore, as shown in FIG. 7, in the case where the third penetration holes 132 are formed on the external panel 100 facing inward to the vehicle, the welding device may pass through the third penetration holes 132 and the second penetration holes 212 to weld the external panel 100 facing outward and the side sill external panel 320.

Through this, the first panel 210 is coupled to the side sill internal panel 310 and the side sill external panel 320, and one surface of the external panel 100 is coupled to the side sill internal panel 310 or the side sill external panel 320 to improve the bonding force between the side sill reinforcement member 1 and the side sill internal panel 310 and the side sill external panel 320.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A side sill reinforcement member for a vehicle, the side sill reinforcement member comprising:
    an external member including a plurality of external panels extending in a longitudinal direction of the vehicle and forming an internal space therein by coupling the external panels to each other; and
    an internal reinforcement member mounted in the internal space of the external member and including a plurality of internal panels extending in the longitudinal direction of the vehicle, the internal panels being fixed on a first side thereof to a respective internal surface of the external panels and fixed on a second side thereof in contact with each other in the internal space of the external member, respectively,
    wherein the plurality of external panels are coupled at an upper and a lower portion thereof to each other, and the internal panels include a first panel extending in the longitudinal direction of the vehicle in the internal space of the external member and coupled at an upper portion and a lower end portion thereof together with the upper portion and the lower portion of the external panels.

2. The side sill reinforcement member of claim 1, wherein the internal panels further include second panels extending in the longitudinal direction of the vehicle and in a widthwise direction of the vehicle to connect the external panels and the first panel.

3. The side sill reinforcement member of claim 2, wherein the second panels include a central portion bent to be bonded to the first panel and connecting portions extending from the central portion, each of the connecting portions including at a distal end portion thereof a flange portion coupled to an internal side of the external panels.

4. The side sill reinforcement member of claim 1,
    wherein the external panels are in a pair, and
    wherein the external panels include respective upper flanges bent upward at upper end portions thereof and being coupled in pair and respective lower flanges bent downward at lower end portions thereof and being coupled in pair.

5. The side sill reinforcement member of claim 3, wherein the external panels include a plurality of first penetration holes allowing a bonding device for bonding the first panel and the second panels to pass therethrough and spaced from each other in the longitudinal direction of the vehicle.

6. The side sill reinforcement member of claim 1, wherein the external panels include first beads formed on an upper surface or a lower surface thereof.

7. The side sill reinforcement member of claim 1, wherein the internal panels include second beads formed on an upper surface or a lower surface thereof.

8. The side sill reinforcement member of claim 1, wherein the external panels or the internal panels include beads formed on an upper surface or a lower surface thereof, the beads extending in a widthwise direction of the vehicle.

9. The side sill reinforcement member of claim 1, wherein the external panels and the internal panels are made of steel and coupled together by welding.

10. A side sill assembly for the vehicle which is provided with the side sill reinforcement member of claim 1, the side sill assembly comprising:
a side sill internal panel and a side sill external panel covering the side sill reinforcement member therein,
wherein the external panels are coupled to the side sill internal panel or the side sill external panel.

11. The side sill assembly of claim 10, wherein the side sill internal panel and the side sill external panel are coupled at an upper portion thereof to cover the side sill reinforcement member therein, and the first panel includes extension portions extending upward and downward at upper and lower end portions thereof, the extension portions being coupled together with the upper portion and a lower portion of the side sill internal panel and the side sill external panel.

12. The side sill assembly of claim 11,
wherein the first panel includes a second penetration hole formed therein, and the external panels include a third penetration hole formed therein, and
wherein the second penetration hole and the third penetration hole are formed at positions corresponding to each other laterally to allow a bonding device to pass therethrough for bonding the external panels to the side sill internal panel or the side sill external panel.

13. The side sill assembly of claim 12, wherein the second penetration hole and the third penetration hole are formed in plurality by being vertically spaced from central portions of the first panel and the external panels.

* * * * *